United States Patent
Reilly

(10) Patent No.: US 12,259,634 B2
(45) Date of Patent: Mar. 25, 2025

(54) MULTIPLEXED SINGLE PHOTON SOURCE USING ONE-WAY SWITCHING ELEMENTS

(71) Applicant: Michele Reilly, Austin, TX (US)

(72) Inventor: Michele Reilly, Austin, TX (US)

(73) Assignee: Second Foundation, Inc.

( * ) Notice: Subject to any disclaimer, the term of this patent is extended or adjusted under 35 U.S.C. 154(b) by 534 days.

(21) Appl. No.: 17/708,123

(22) Filed: Mar. 30, 2022

(65) Prior Publication Data
US 2022/0317544 A1  Oct. 6, 2022

(30) Foreign Application Priority Data
Mar. 31, 2021 (EP) ..................................... 21166319

(51) Int. Cl.
G02F 1/39 (2006.01)
H04B 10/70 (2013.01)
H04Q 11/00 (2006.01)

(52) U.S. Cl.
CPC .............. G02F 1/39 (2013.01); H04B 10/70 (2013.01); H04Q 11/0001 (2013.01); H04Q 2011/0018 (2013.01)

(58) Field of Classification Search
CPC ........ G02F 1/39; G02F 1/3501; G02F 1/3526; H04B 10/70; H04Q 11/0001; H04Q 2011/0018
(Continued)

(56) References Cited

U.S. PATENT DOCUMENTS

| 2004/0109633 A1* | 6/2004 | Pittman ..................... G02F 3/00 385/16 |
| 2006/0164706 A1* | 7/2006 | Pittman ..................... G02F 3/00 359/107 |

(Continued)

FOREIGN PATENT DOCUMENTS

WO   WO 2011/028857   3/2011

OTHER PUBLICATIONS

European Patent Office, European Search Report, App. No. EP 21 16 6319 (Sep. 21, 2021).

(Continued)

*Primary Examiner* — William R Alexander
(74) *Attorney, Agent, or Firm* — The Belles Group, P.C.

(57) ABSTRACT

A multiplexed single photon source for quasi-deterministically generating single photons, wherein heralded random single photons generated by pulsed random single photon source are sent through a series of optical switches each having first and second input and output modes and each capable of being switched from a first state corresponding to a SWAP operation to a second state corresponding to an Identity operation on the mode space, whereby the first and second input and output modes of the switches are connected in series to form a first and second optical path respectively, and whereby a first output mode of a last optical switch forms the output mode of the multiplexed single photon source and a second output mode of the last optical switch is connected by a delay loop introducing a time delay $T_d$ to the second input mode of a first optical switch. It furthermore relates to a method of quasi-deterministically generating single photons with such a multiplexed single photon source, the method comprising initializing, before or at the start of a first cycle, the first switch in the first state and all subsequent switches in the second state; switching, when the generation of a random single photon is (Continued)

heralded, the first switch to the second state after that photon has been routed onto the closed optical path formed by the second optical path and the delay loop, thereby ensuring that the photon may loop around the closed optical path; and, switching, at the start of the Nth cycle, a last switch of the series of optical switches into the first state, thereby causing the photon to be routed out of the closed optical path and into the output mode of the multiplexed single photon source, such that the photon is output quasi-deterministically at a time N Td after the start of the first cycle.

20 Claims, 6 Drawing Sheets

(58) Field of Classification Search
USPC .............................................................. 359/6
See application file for complete search history.

(56) References Cited

U.S. PATENT DOCUMENTS

2011/0211244 A1\* 9/2011 Peters ................... H04L 9/0855
359/227
2018/0145768 A1 5/2018 Park et al.

OTHER PUBLICATIONS

Pittman et al: "Single Photons on Pseudo Demand from Stored Parametric Down-Conversion," American Physical Society, vol. A66, pp. 1-7, (Jan. 1, 2022).

\* cited by examiner

MULTIPLEXED SINGLE PHOTON SOURCE USING ONE-WAY SWITCHING ELEMENTS

PRIORITY

This application claims priority from EP21166319 filed on Mar. 31, 2021, the entire contents of which are incorporated herein by reference.

FIELD

The present disclosure relates to methods and devices for generating single photons usable in quantum communication and computation.

BACKGROUND

The most commonly used source of single photons is known as a Spontaneous Parametric Down Conversion (SPDC) single photon source. This is a non-linear crystal (i.e. a $\chi_2$ material such as beta-barium borate or Lithium Niobate) that interacts in a non-linear way with optical photons. This $\chi_2$ crystal is 'pumped' with a low power laser of frequency co. Due to the weak, but finite interaction with the $\chi_2$ crystal, there is a small probability that one of the photons in the pump laser will spontaneously split into two individual photons of frequency $\omega_s$ and $\omega_i$, where s and i are referred to as the signal photon and the idler photon.

SPDC sources are highly probabilistic because the conversion of a single photon to two individual photons is caused by the non-linear interaction with the $\chi_2$ crystal and it is extremely weak. Even the highest efficiency SPDC sources currently known will convert approximately 4 out of $10^6$ pump photons. Dependent on the power and therefore the number of photons in a pump pulse, there is therefore some probability p of generating a photon pair during a pump pulse. For known crystal and pump laser combinations p<<1.

In so called Type-II SPDC single photon sources, the signal and idler photon are constrained to have mutually orthogonal polarizations and the polarizations form of a singlet state of the form $1/\sqrt{2}(|H>_s|V>_i-|V>_sH>_i)$, where H and V stand for horizontal and vertical polarization respectively. Thus, signal and idler photon form a Bell-pair, which allows the detection of one to serve as heralding signal for the presence of the other. Thus, known SPDC single photon sources are heralded random single photon sources, that produce single photons only randomly and with low probability, but if it they do one can know it. This feature is necessary for most applications in quantum communication and in particular quantum computation.

Given the low probability of success of known SPDC sources, they are not suitable for applications that rely on a single photon being reliably present at a certain point in time, such as when a short lived quantum state is to be teleported. Thus there is a desire to increase the success probability p. In particular, there is a desire for a quasi-deterministic single photon source, i.e. one in which the success probability p can be brought arbitrarily close to 1 by a suitable scaling of the source layout.

In the art it is known to built multiplexed single photon sources in which two or more random single photon sources, such as the SPDC single photon sources just described, are connected into a binary tree structure using a number of t optical switches. These switches are built up from a phase shifter sandwiched between two directional couplers. A directional coupler comprises two optical waveguides brought in close proximity to each other at one point, such that photons may tunnel between the waveguides. If the proximity is such that the resulting tunnelling probability equals 50%, the directional coupler acts as a 50-50 beamsplitter on the space of the modes corresponding to the ingoing and outgoing waveguide portions. Since the layout is symmetrical, the naming and use as "ingoing" and "outgoing" modes may be interchanged.

The phase shifter comprises simply placing a thermal pad, which is connected to a control coupler for coupling in the control signal, close to one of the arms of the two optical paths between the two proximity points of the directional couplers. The open portions of the optical paths/waveguides leading to/from the proximity points of the directional couplers serve as the input and output modes of the switch. The switches are symmetric relative to interchanging the input and output modes.

By help of the thermal pad the arm next to the pad may be heated, which will cause a change of the refractive index of the wave guide material. Due to this change, a there is a relative change of the effective path lengths of the two arms, which will lead to a phase shift between photons travelling along both arms.

In the art it is known to use arms of equal length, such that in the cold state, i.e. when the thermal pad is inactive the relative phase between the first and second optical paths is zero. In this case the described switch amounts to a unitary mapping of the input modes onto the output modes corresponding to an identity operation. A relative phase shift will now lead to this unitary mapping to correspond to a different operation. If the temperature is chosen right, a phase shift equal to $\pi$ can be achieved, in which case the switch amounts to a unitary mapping corresponding to a SWAP operation, i.e. a photon entering in the first input mode will be output on the second mode and vice versa, with no relative phase shift between the output modes.

Thus, by help of the thermal pad, the optical switches may be switched from a first state to a second state. The errors in the corresponding unitary operations are dependent, in case of the "off" or default state, on the precision of the fabrication and, in case of the "on" state, on the control accuracy and precision of the induced phase shift, which in turn depends on the accuracy and precision to which one of the arms of the phase-shifter may be heated by the thermal pad.

Known multiplexed single photon sources place a number of known random single photon sources as the leafs of a binary tree, while as each inner node of the tree one of the aforedescribed two-way optical switches is used.

Based on the heralding signals of the SPDC single photon sources the switches are controlled such that one of the produced photons, if any, is routed to the output mode of a last optical switch serving as a root node. The lengths of the optical paths are chosen such that, wherever that photon was produced, it is output at a certain time or within a certain short time window after the pump pulse. If there is more than one random single photon generated in one pulse the unused photons may be discarded.

In such a binary tree type multiplexed single photons source comprising K random single photon sources, disregarding losses, the probability of producing a single photon is given as $1-(1-p)K$. So for any probability p of the individual random single photon sources, by choosing K large enough the overall success probability can be made to be arbitrarily close to 1. Therefore, such a multiplexed source does represent a quasi-deterministic single photon source.

However, a disadvantage of binary-tree type multiplexed single photon sources stems from a limitation of the thermally controlled optical switches described above, namely that while they can be switched "on", i.e. from their default state into a state with a different relative phase shift, relatively quickly, they cannot be quickly turned "off" again. This is because heating one of the phase-shifter arms by the thermal pad may be done comparatively fast. However, the reverse process, i.e. the cooling of the arm to its initial temperature, takes orders of magnitude longer, since even very small remaining temperature differences between the two arms lead to a small remaining phase shift, such that the unitary operation performed by the phase shifter is not the intended one of its default state.

Therefore, the single photon generation rate of a binary-tree multiplexed quasi-deterministic single photon source as described above is limited by $T_c$, the cooling-off time of the involved optical switches, which is, as stated, far larger than $T_s$, the heating-induced switching time. Since $T_c$ is usually also far larger than $T_p^{min}$, the lowest possible pulse period of the pulse lasers used, the full potential of the pulse laser cannot be realised.

Moreover, the known binary-tree multiplexed single photon sources use a large number of random single photon sources as well as a large number of switches. In particular, to achieve a desired overall success probability of at least $P_s$, the number of random single photon sources required is given by $\ln(1-P_s)/\ln(1-p)$. If, e.g., an overall success probability Ps>=99% is desired with individual random single photon sources generating a photon on average only every 100th pulse at least 459 random single photon sources need to be multiplexed together into a binary tree by a similar number of two-way optical switches. This constitutes a very complex arrangement of optical components, which in any physical implementation is going to be very large and costly and, due to its complexity, also potentially unreliable.

The international application published as WO 2011/028857 A2 proposes a system and method of producing heralded single photons 5 wherein a burst of P pairs of correlated photons is created by sending a pulse of pump laser light through a non-linear crystal, separating the photons of each pair into a first and second optical path respectively and sending the photons on the first optical path through a Two Photon Absorber, which will absorb two photons P Div 2 times, thereby reducing the number of photons on the first path to P Mod 2. The photons on the second path are send to a photon number resolving detector, the output of which provides the heralding signal.

Thus source of heralded photons is created which reliably outputs 0 or 1 photon but not more. In one embodiment an optical switch operated based on the heralding signal and able to route photons into a delay loop is added to the first optical path. If P is odd the single photon which remains after the TPA will be routed onto the delay loop and remain stored therein for a certain number of cycles, depending on when it was switched into the delay loop, so that a single photon is emitted with a high probability in a narrow time window. However, whether this involves multiple pump cycles of the pump laser remains unspecified.

The US patent application publication US 2018/0145768 A1 describes a photon generating apparatus which comprises an optical switch with two in 25 put and two output modes, wherein one of the output modes is connected by a closed optical path with one of the input modes, thereby enabling buffering the photon on the closed optical path.

In T. B. Pittman et al. "Single photons on pseudodemand from stored parametric down-conversion", Phys. Rev. A 66, 042303 (2002), a pseudo-deterministic heralded single photon source is presented which comprises a Parametric Down Conversion source generating pairs of entangled photons with one photon of the pair used as heralding photon while the other is, based on the detection of the heralding photon, routed into a storage loop by an electro-optical switch. The photon in the storage loop may, ideally, be switched out on command by a user after any number of round trips. Reliability of this pseudo-deterministic single photon source is reduces by storage losses, measured to be 26% per round trip, as well as switching errors.

SUMMARY

Disclosed is a multiplexed single photon source capable of producing pure single photons quasi-deterministically at a predetermined generation time $T_g$=NT_d, with the total number of lap cycles N being a natural number and $T_d$ being a delay time.

In an example, the multiplexed single photon source, the single photon source includes a pulsed random single photon source capable of randomly producing single photons with a probability p at a production rate corresponding to the inverse of a pump period $T_p$, wherein, when a single photon is randomly produced during a pulse, it is heralded by a heralding signal and is output on an output mode of the random single photon source. The multiplexed single photon source further includes a first optical switch and a last optical switch, each having a first input mode and a second input mode and a first output mode and a second output mode, the first input mode of the first optical switch is connected to the output mode of the random single photon source, the first output mode of the last optical switch is connected to an output mode of the multiplexed single photon source, the first and last optical switches moreover each effect a unitary mapping from their respective input modes to their respective output modes, the unitary mapping depending on a state of the respective optical switch, wherein in a first state, the unitary mapping corresponds to a SWAP operation, and in a second state the unitary mapping corresponds to an Identity operation, and the first and last optical switches are capable of being switched from the first to the second state and/or from the second state to the first state within a switching time $T_s$, the switching time $T_s$ being smaller than or equal to the delay time $T_d$, by a control signal. The multiplexed single photon source further includes a closed optical path comprising a delay loop introducing a time delay equal to the delay time $T_d$ to a photon and connecting the second output mode of the last optical switch to second input mode of the first optical switch. The multiplexed single photon source further includes a control unit controlling each of the first and last optical switches based on the heralding signal and the cycle number N, the cycle number corresponding to a maximum number of times a photon may loop around the closed optical path before being output. Before or at the start of a first lap cycle, the control unit is configured to initialize the first optical switch in the first state and, if applicable, the last optical switch in the second state, such that, upon generation of a first photon by the random single photon source, that photon enters the first input mode of the first optical switch and, by being output on the second output mode of the first optical switch, is routed onto the closed optical path. Based upon the heralding signal heralding the first photon, the control unit is configured to switch the first optical switch from its first state to its second state after the photon has been routed onto the closed optical path, thereby ensuring that the first photon loops around the closed optical path as long as the first and last optical switches remain in their respective second states. In an Nth lap cycle, the control unit is configured to switch the last optical switch from the second state to the first state, thereby causing the first photon on the closed optical path to be routed to the first output mode of the last optical switch and thus being output on the output mode of the multiplexed single photon source.

Also disclosed is a method for quasi-deterministically generating single photons at a predetermined generation time $T_g=NT_d$, with the total number of lap cycles N being a natural number and $T_d$ being a delay time, by means of a multiplexed single photon source, the multiplexed single photon source including a pulsed random single photon source capable of randomly producing single photons with a probability p at a production rate corresponding to the inverse of a production period, wherein, when a single photon is randomly produced, it is heralded by a heralding signal and is output on an output mode of the random single photon source. A first optical switch and a last optical switch, each having a first input mode and a second input mode and a first output mode and a second output mode, wherein the first input mode of the first optical switch is connected to the output mode of the random single photon source, wherein the first and last optical switch are configured to realize a unitary mapping from the input modes to the output modes, the unitary mapping depending on a state of the respective optical switch, wherein in a first state, the unitary corresponds to a SWAP operation, wherein in a second state the unitary mapping corresponds to an Identity operation, and wherein the first and last optical switch are capable of being switched from the first to the second state and/or from the second state to the first state by a control signal. The multiplexed single photon source further includes a closed optical path comprising a delay loop introducing a delay Td to a photon and connecting the second output mode of the last optical switch to second input mode of the first optical switch; The multiplexed single photon source further includes a control unit controlling each of the first and last optical switches based on the heralding signal and a cycle number N, the cycle number N being a natural number corresponding to a number of.

In one example, the method includes before or at the start of a first lap cycle, initializing the first optical switch in the first state and, if applicable, the last optical switch in the second state, such that, upon generation of a first photon by the random single photon source, that first photon enters the first input mode of the first optical switch and, by being output on the second output mode of the first optical switch, is routed onto the closed optical path. The method further includes, based upon the heralding signal heralding the first photon, switching the first optical switch from its first state to its second state after the photon has been routed onto the closed optical path, thereby ensuring that the photon loops around the closed optical path as long as the first and last optical switches remain in their respective second state. The method further includes, in an Nth lap cycle, switching the last optical switch from the second state to the first state thereby causing the first photon on the closed optical path to be shunted to the first output mode of the last optical switch and thus being output on the output mode of the multiplexed single photon source.

Also disclosed is a method for quasi-deterministically generating single photons with a multiplexed single photon source wherein heralded photons generated by random single photon source are sent through a series of optical switches each having first and second input and output modes and each capable of being switched from a first state corresponding to a SWAP operation to a second state corresponding to an Identity operation on the mode space, wherein the first and second input and output modes of the optical switches are connected in series to form a first and second optical path respectively, and wherein a first output mode of a last optical switch forms the output mode of the multiplexed single photon source and a second output mode of the last optical switch is connected by a delay loop introducing a time delay $T_d$ to the second input mode of a first optical switch, wherein the first and last optical switches may be the same component.

In an example, the method includes initializing, before or at the start of a first lap cycle, the first switch in the first state and all subsequent switches in the second state. The method further includes switching, when the generation of a random single photon is heralded, the first switch to the second state after that photon has been routed onto the closed optical path formed by the second optical path and the delay loop, thereby ensuring that the photon may loop around the closed optical path. The method further includes switching, at the start of the Nth cycle, a last switch of the series of optical switches into the first state, thereby causing the photon to be routed out of the closed optical path and into the output mode of the multiplexed single photon source, such that the photon is output quasi-deterministically at a time $NT_d$ after the start of the first lap cycle.

Further details and features of embodiments of the present disclosure are described below with reference to the figures of preferred exemplary embodiments. These are only intended to illustrate the various embodiments, and in no way to limit the scope of the disclosure.

DETAILED DESCRIPTION

Figure 1A:
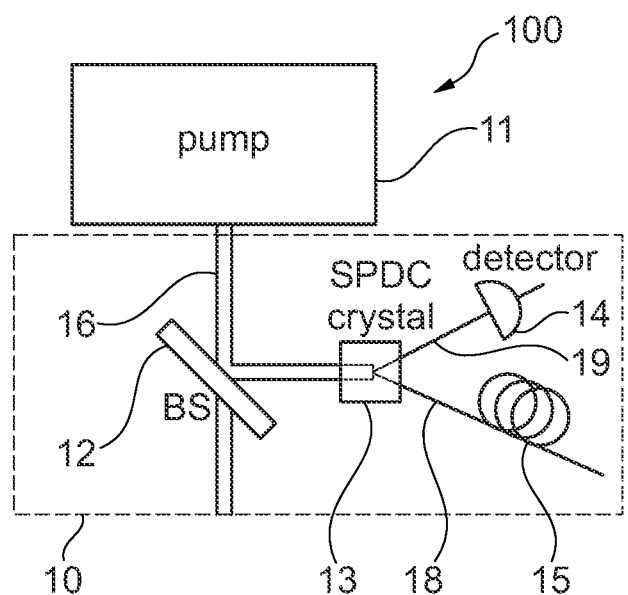
FIG. 1A is a schematic illustration of a known heralded single photon source.

In the following, illustrative embodiments of the device and the method for performing quantum computing according to this invention are presented. In the figures, the like reference numerals denote features of like or corresponding function or meaning.

It is an object of the disclosed to provide improved quasi-deterministic single photon sources and methods for controlling them that overcome these limitations.

In particular, this disclosure seeks to provide quasi-deterministic single photon sources that allow using pulsed random single photon sources at their full possible pulse rate.

It is a further object of the invention to find quasi-deterministic single photon sources of low complexity, using fewer components than known sources.

It is a further object to find a type of optical switch for use in multiplexed single photon sources which allows more fast switching operations.

In one aspect of the invention, the last object is achieved by a double-switching optical switch, which is similar in design to the known one-way optical switch but comprising, in addition to the first thermal pad in proximity to the first arm of the phase shifter, a second thermal pad in proximity to the second arm of the phase shifter.

Thus, after switching the optical switch from its first or default state corresponding, e.g., to a SWAP operation on its input modes, to its "on" or second state corresponding, e.g., to an Identity operation, within a switching time $T_s$ by activating the first thermal pad, it may be switched back to its first or default state by activating the second thermal pad to heat the second arm of the phase shifter to have the same temperature as the first arm, thereby effectively negating the effective optical path length difference created by the prior activation of the first thermal pad. This second switching operation takes as long as the first one, i.e. is completed after the switching time $T_s$.

Of course, the second thermal pad could alternatively also be used to switch to a third state instead of back to the first state.

In another aspect of the invention, some of its objects are achieved by a quasi-deterministic multiplexed single photon source according to the independent multiplexed single photon source claims which in some embodiments uses the double-switching type optical switch of the first aspect, but may also, in other embodiments, be realized purely with known one-way optical switches capable of only one fast switching operation.

In this multiplexed single photon source, randomly generated single photons generated by a pulsed heralded random single photon source, e.g. an SPDC single photon source as known in the art, driven at a pulse frequency of $1/T_p$, where $T_p$ is the pulse period and each randomly generating photon is heralded, i.e. is accompanied by a heralding signal, are sent through a series of one or more optical switches each having first and second input and output modes and each capable of being switched from a first, or default state to a second state within a switching time $T_s$.

The output mode of the random single photon source is connected to the first input mode of a first optical switch in the series of optical switches. For this first optical switch, the first or default state corresponds to a SWAP operation on its first and second input modes, while for the subsequent optical switches, if present, this default state corresponds to an Identity operation on their respective first and second input modes. In this manner, a photon generated by the random single photon source entering in the first input mode of the first optical switch is output on its second mode.

In embodiments of the invention using only a single switch, which is then necessarily at the same time the first and last switch in the series, this switch is a double type switch according to the first aspect of the invention, i.e. it may be switched from its second state back to its first or default state within the switching time Ts.

In embodiments using more than one optical switch, all but the first and a last one of the series of optical switches are also double switch-type optical switches.

In the series of optical switches according to embodiments of the invention, the first and second input and output modes of the optical switches are connected in series to form a first and second optical path respectively, i.e. the first output mode of the Mth switch is connected to the first input mode of the m+1st switch and the second output mode of the Mth switch is connected to the second input mode of the m+1st switch with m running from 1 to M−1, where M is a natural number denoting the total number of switches in the series. The first input and output modes therefore lie on the first optical path while second input and output modes lie on the second optical path.

A first output mode of a last, or Mth, optical switch, which may be the same component as the first optical switch, forms the output mode of the multiplexed single photon source as a whole while a second output mode of that last optical switch is connected by a delay loop introducing a time delay $T_d$ to the second input mode of the first optical switch in the series. Thereby, the second optical path and the delay loop together form a closed optical path around which a photon may loop repeatedly, each lap requiring a lap time $T_l=T_d+T_2$ with $T_2 \ll T_d$ being the time taken to traverse the second optical path, without being output from the quasi-deterministic single photon source, as long as all optical switches in the series are in a state corresponding to an Identity operation. For all but the first optical switch in the series this means that they are in their respective "off" or default state, while for the first switch this is the "on" state, since, in some embodiments, it may by default be in a state corresponding to a SWAP operation.

The multiplexed quasi-deterministic single photon source according to this aspect of the invention may further comprise a control unit receiving the heralding signals from the random single photon source and based on these signals as well as a time elapsed since the start of a generation cycle controls the optical switches in the series to ensure that a single photon is output quasi deterministically around a time $NT_l$ after the start of the generation cycle, where the total cycle number N is a natural number and has the meaning of the maximum number of times a randomly generated photon may loop around the closed optical path after it has been routed onto that path by on of the first M−1 switches.

In embodiments with more than one optical switch in the series of optical switches, the last switch is always only used to rout a photon from the closed optical path to the output mode of the multiplexed single photon source and therefore does not have to be of the double-switching type described above in connection with the first aspect of the invention. For this last optical switch it is sufficient if it is of the known one-way type where only the switching from the "off" or default state to the "on" state can be accomplished quickly, i.e. within the switching time $T_s$, while no actual switching is possible from the "on" state back to the "off" state.

The multiplexed single photon source may be operated in a pulsed manner with a generation cycle period of $T_g=NT_l$, each generation cycle comprising N lap cycles of duration $T_l$, corresponding to one lap of a photon around the closed optical path. This is possible if $T_g>T_c$, such that the optical switches will have had time to reset to their default state.

The functioning of the multiplexed single photon source according to embodiments of this aspect of the invention is described in more detail connection with the third aspect of the invention hereinafter below.

In a third aspect of the invention some of its objects are achieved by a method of quasi-deterministically generating single photons using a multiplexed single photon source as described hereinabove.

In summary, this method comprises initializing, before or at the start of a first lap cycle, the first optical switch of the series of optical switches in the a first state corresponding to a SWAP operation, and, if present, all subsequent optical switches in a second state corresponding to an Identity operation on the first and second input modes of the respective switch; switching, when the generation of a photon by the random single photon source is heralded, the first switch to the second state after that photon has been routed onto the closed optical path formed by the second optical path and the delay loop, thereby ensuring that the photon may loop around the closed optical path; and, switching, at the start of the Nth cycle, a last switch of the series of optical switches into the first state, thereby causing the photon to be routed out of the closed optical path and into the output mode of the multiplexed single photon source, such that a photon is output quasi-deterministically at a time $T_g=NT_l$ after the start of the first cycle.

The working of the method according to this aspect of the invention will now be described in more detail.

A generating cycle of duration $T_g$ is subdivided into N sub-cycles or lap cycles, each of duration $T_l$, where the total cycle number N is a natural number and $T_l$ the time a photon requires to complete one lap of the closed optical path.

At the start of a generating cycle, all optical switches are initialized in their default state, which in case of the first optical switch in some embodiments may correspond to a SWAP operation, while in the case of subsequent switches in the series of optical switches, the default state corresponds to an Identity operation. Therefore, the first photon to be generated by the random single photon source, entering the first mode of the first optical switch, will output on the second output mode of that first optical switch and thereby be routed or shunted onto the closed optical path.

If the default state of the first optical switch corresponds to a SWAP operation, this happens without any intervention of the control unit. However, if the first switch were to remain in this default state, the photon would be routed out of the closed optical path after its first lap. Unless by chance that first random photon happened to be generated in the penultimate, i.e. N−1st, lap cycle, this is not desired. Therefore, after receiving a heralding signal heralding the generation of a first photon by the random single photon source, and after that photon has traversed the first optical switch and based on the number n counting the current cycle being smaller than N−1, the control unit will switch that first optical switch to its "on" state, thereby ensuring that the photon remains on the closed optical path.

When n reaches n=N, i.e. at the beginning of the last lap cycle and after the photon on the closed optical path has cleared the second optical path and entered the delay loop, which can be ensured by waiting sufficiently long after the start time of the (N−1)st lap cycle, e.g. in some embodiments until time $(N-\frac{1}{2})T_l$, a last optical switch in the series is switched to a state corresponding to a SWAP operation. Thus, when the photon next passes through that last optical switch, which will be close to the end of that generation cycle, i.e. at a time $NT_l-\tau$, where $\tau<<T_l$ is the short time it takes to photon to travel down the output mode and be output, after the start of that generation cycle, it will be shunted out of the closed optical path and into the output mode of the multiplexed single photon source, which will thereby output a quasi-deterministic single photon at the predetermined time $T_g$.

In some embodiments with more than two optical switches in the series of optical switches, intermediate optical switches, i.e. optical switches interconnected into the first and second optical paths between the first and the last optical switch, which in these embodiments are two separate components, may be used to route further single photons onto the closed optical path, either to store more than one photon on that path for later use, e.g. to be output to different client devices connected to the output mode of the multiplexed single photon source, or to "refresh" single photons that have looped around the closed optical path a number of times, thereby potentially having been lost due to the inevitable losses associated with the delay loop or the optical switches.

When one of the intermediate optical switches is used to rout a fresh randomly generated single photon onto the closed optical path, the one photon occupying it, if it has not been lost due to absorption losses of the optical path, is always routed out of the optical path and, traversing the remainder of the first optical path, exits the multiplexed single photon source via its output mode. Depending on the application the multiplexed single photon source is employed in, such a photon exiting at a random time may be used for some information processing or communications task. However, in most circumstances, such a photon coming out of the source at a random time is not useful and will simply be discarded.

A delay loop in the output mode of the random single photon source ensures that the control hardware has sufficient time to act on the heralding signal and switch an as yet unused optical switch of the series of optical switches to its "on"-state, s.t. a photon is routed onto the closed optical path.

The time scales involved in the method according to this aspect are far too short for it to be implemented by a human reacting to the heralding signals to, based on the current cycle, select and activate a optical switch. Typical delay times are between 1 and 10 ns, leading to total generation cycle times in the range of, at most, 10-100 µs. Therefore some type of automation is required and a control unit in the form of dedicated electronic circuitry or a software run on a general purpose computer will be carrying out the steps of the method as described above, controlling the optical switches based on the heralding signals received. This control unit may be regarded part of the quasi-deterministic single photon source according to the first aspect, even if it is not physically co-located with the other components. The optical switches may, for instance, be controlled by a lab computer responsible for controlling several multiplexed single photon sources at the same time together with other equipment or experiments.

Further preferred embodiments of the multiplexed quasi-deterministic single photon source according to the second and third aspect will be described in the following. The skilled person will appreciate that features of these embodiments may be freely combined as long as there is no contradiction.

In embodiments of the multiplexed single photon source according to the second aspect of the invention described above where there is only a single optical switch of double-switching type, that switch is both the first and last switch in the series and is therefore, when the photon on the closed optical path is to be output, switched from its "on"-state back to its default state. These embodiments have the advantage of realizing the concept of the invention with the fewest number of components. On the downside, the overall success probability of the source is going to be lower due to the chance of losing the photon while it is being "stored" on the closes optical path.

Photons travelling on optical paths inevitably experience losses. In case of the multiplexed single photon sources presented here, the closed optical path is the single biggest contributor to loss. Current optical fibers and silicon waveguides show loss rates of 0.024 dB/ns. Since the lap times $T_l$ of the closed optical path in practical embodiments are between 1 and 20 ns, the expected per lap losses are between 0.024 dB and 0.48 dB, corresponding to per lap loss probabilities between 0.27% and 5.7%.

Thus, if the cycle number N is comparatively large and the randomly generated photon, which is essentially to be stored on the closed optical path until the desired, predetermined output time $T_g$ at the end of the generation cycle, is generated during one of the earlier lap cycles, there is a high chance that it will have been lost until the output time. However, improvements in fiber and waveguide technology reducing the loss rates will make this downside of the single-switch embodiments less relevant.

In embodiments of the multiplexed single photon source according to the second aspect of the invention described above where there two ore more optical switches, a first and a last optical switch may be of the single switching or one-way type.

In preferred embodiments there are exactly two one-way optical switches, namely only the first and the last switch. These embodiments are almost as simple as the embodiments with only a single optical switch of double-switching type and share their disadvantage of lower overall success probability due to photon losses, but have the advantage of being implemented using only optical switches of known design.

In further preferred embodiments of the second aspect of the invention, there are more than two optical switches in the series of optical switches. The additional switches may be used to rout further randomly generated single photons onto the closed optical path. All switches except the first and the last optical switch need to be of the double-switching type according to the first aspect of the invention described above. This is the case, since they need to be reset to their default state corresponding to an identity operation essentially immediately after use, since otherwise any photon passing that switch subsequently, e.g. the photon just routed onto the closed optical path after completing its first lap, will be routed right out of the closed optical path and thus prematurely exit the multiplexed single photon source via its output mode.

Having more than two switches allows refreshing photons on the closed optical path, and thereby replenishing a lost photon. If, after in some earlier cycle a photon has already been routed onto the closed optical path, the generation of a further photon by the random single photon source is heralded by a heralding signal, an as yet unused optical switch is switched to its "on"-state corresponding to a SWAP operation. In embodiments where the pumping period Tp and lap time Tl are chosen such that the pumping pulses from the pump laser and therefore the generation times of the random photons is synchronized with the time when a photon on the closed optical path passes through the series of switches, the further photon will be swapped for the photon on the closed optical path, if any, currently passing through the series of optical switches. If there still was a photon on the closed optical path, it will exit out of the output mode of the multiplexed single photon source and most likely be discarded. However, if that photon had already been lost (there is no way of knowing since measuring that photon would inevitably destroy it), it is in this way replenished. In either case, a fresh photon is now on the closed optical path, occupying the time bin of the previous photon. Since there are now fewer lap cycles left until the end of the generation cycle, the overall success probability has been boosted.

In preferred embodiments there are as many optical switches as there are sub-cycles in a generation cycle, i.e. M=N. In these embodiments, it is possible to refresh a photon on the closed optical path after every lap.

It is, however, very unlikely that the full refreshing capability will be used, since this is equivalent to the random single photon source producing one random photon per every lap of the closed optical path, in embodiments with $T_p=T_l$ this means it would have to succeed in producing one photon every pumping pulse. This is very unlikely.

Therefore, in further preferred embodiments using fewer components, the number of optical switches is chosen between 2 and N. For instance there may be a total of M=3, 4, 5, 6, 8, 10, ln(N)+2, sqrt(N)+2 or N/2+2 optical switches, allowing 1, 2, 3, 4, 6 or 8, ln(N), sqrt(N) or N/2 opportunities for refreshing a photon on the closed optical path.

In a preferred embodiment of the method according to the third aspect of controlling a multiplexed single photon source according to the second aspect with more than two optical switches interconnected in series, the intermediate optical switches, i.e. the switches between the first and the last optical switch are controlled in a greedy fashion. That is, as long as there are unused intermediate optical switches, a first unused intermediate optical switch is used to shunt a further random single photon onto the closed optical path.

In another preferred embodiment of the method, intermediate switches are not used greedily but, in order to boost the overall success probability, are kept in reserve for use towards the end of a generation cycle. For instance, on each occasion a further random single photon is heralded, the decision to use or not use the next unused intermediate optical switch may be made probabilistically based on a probability $p_c$. In some embodiments, $p_c$ may be chosen as a constant number irrespective of the total number of switches, for instance $p_c=½$, or dependant on the total number of switches, e.g. $p_c=1/(M-1)$.

However, in preferred embodiments, the switch use-probability $p_c$ is dependent on the number n counting the current cycle, and in particular increases monotonically with n. for instance, $p_c$ may be chosen $p_c=\min[1, n/(N-D)]$ with the parameter D a natural number. In this fashion the use probability increases linearly with n until it reaches 1 in the (N−D)th lap cycle.

It is preferred that $p_c$ may depend on both the current cycle number n and the total number of optical switches M. For instance, for N>M it is proposed to use the dependence $p_c=\min[1, n/(N-M)]$ in preferred embodiments. In this way there is the potential for all intermediate switches to be used.

In even more preferred embodiments, $p_c$ may depend on the number of as yet unused intermediate switches u, e.g. according to $p_c=\min[1, n/(N-u)]$ or $$p_c = \min\left[1, \frac{n}{N - uN/(M-1)}\right].$$

Alternatively, the decision to use or not to use unused the next unused intermediate switch may be made deterministically. A preferred deterministic strategy is to not use intermediate optical switches until the last D cycles, with D being a natural number $N>D\geq M-2$. That is, in the first N−D cycles, any heralded random photon after the first one is simply ignored (the first one being shunted onto the closed optical path by the first switch by default), while for the last D cycles a greedy strategy is used, with every heralded random photon generated being shunted onto the closed optical path. In particular, D may be chosen D=M−2 in order to postpone using intermediate switches to the last possible cycle where there is still a possibility, depending on enough heralded random photons to be generated during these last lap cycles, for all of them to be used.

Preferably, such a non-greedy control strategy is used for multiplexed single photon sources with only a comparatively small number of optical switches in series, such as 3, 4, 5 or $\ln(N)+2$ optical switches.

In some embodiments of the multiplexed single photon source according to the second aspect and the method of controlling it according to the third aspect, there is always only a single photon looping around the closed optical path. In these embodiments, the pump period $T_p$ and the time delay $T_d$ of the closed optical path are chosen such that the time $T_l$ it takes a photon to complete one lap around the closed optical path equals one pump period, i.e. $T_p=T_l$. The lap time $T_d$ is given by the sum $T_l=T_d+T_2$, with $T_2$ being the time a photon requires to traverse the second optical path connecting the second input and output modes of the series of optical switches. This time is usually on the order of 100 ps or less, while $T_d$, to match the pump frequencies achievable by pulsed pump lasers, is on the order of one to a few tens of nanoseconds. Therefore, often $T_2$ may be neglected and $T_l$ assumed to be approximately equal to $T_d$.

In other embodiments, the pump period $T_p$ and $T_l$, via $T_d$, is chosen such that $T_l>T_p$. In particular, in preferred embodiments, $T_p$ is a fraction of $T_l$, i.e. $T_p=T_l/c$, where c is an integer larger one, c>1. In these embodiments there may be up to c randomly generated single photons on the closed optical path at the same time. Each photon can be thought to occupy a time bin of width/duration $T_p$, with the entire closed optical path holding exactly c of these bins. These c time bins make up one cycle of duration $T_l$, thus together with the cycle number N in a full generation cycle, there are N a time bins.

In these embodiments, the series of optical switches preferably comprises at least 2 c−1 optical switches, with the first switch being of the double-switching type. This allows for each of the c time bins on the closed optical path to be filled and emptied by two of the optical switches with the exception of a first time bin, which is served by the first optical switch in the series, which may be used to both fill and empty that first time bin.

More preferably, there number of optical switches is given by M=cb−1 or M=cb with b>2. This allows to mitigate the inevitably occurring photon losses by having, for each time bin, reserve optical switches which may be used to "refresh" any photon in that bin, if a randomly generated photon becomes available.

Even more preferably, b=N allowing the maximum number of refresh opportunities for all of the time bins.

How these additional photons are used depends on the application in which the multiplexed single photon source is employed. In applications where a temporal uncertainty of the quasi-deterministic output photons of $T_l$ or larger is tolerable, any of the, potentially, c photons may be selected to be the ultimate output photon of the multiplexed single photon source. Thus, the additional photons may be used to boost the overall success probability by a factor of c.

However, if the application requires the photon to be output within a time window shorter than $\pm T_l/2$, only a subset of the c time bins within one cycle are eligible as output photons, resulting in a smaller increase in overall success probability.

In other applications, the additional photons are treated as fully separate output photons which may be routed to different final destinations/client devices. This allows one multiplexed single photon source according to such an embodiment to service up to c different client devices.

In order to have, on average, the same probability of not having lost a photon in one of the c bins as compared to a multiplexed single photon source with M switches and only one photon on the closed optical path, the number of optical switches would have to be cM, thus significantly more components are required. In comparison to c separate multiplexed single photon sources with M optical switches, using only one with cM optical switches and (up to) c photons on the closed optical would, however, still reduce the overall number of components as well as complexity, since only one random single photon source and one delay loop are required.

In these embodiments, c has to be small enough that sufficient temporal, and thus also spatial, separation is maintained between subsequent photons. If this is not the case, a routing or shunting action on one of the photons will affect at least the immediately preceding and/or following photon leading to additional losses. As the time-uncertainty of a photon is inversely proportional to its energy, and thus frequency, higher frequency photons may be more closely spaced (both in time and space) along the closed optical path.

A known random single photon source is illustrated schematically in FIG. 1A. The random single photon source 100 comprises a pump laser 11 sending pulses of pump laser light 16 via a beamsplitter 12 into an SPDC crystal 13. The beamsplitter 12 is not essential to the functioning of the source 100 and merely serves to allow stacking of multiple random single photon sources 100 as illustrated in FIG. 1C below. Therefore, the beamsplitter 13 serves to "tap-off" part of the photons of the pump laser light. Due to a non-linear interaction between the pump laser light 16 and the crystal, each photon of the pump laser light 16 has a certain, small, chance to be split into two photons which, due to momentum conservation, will propagate with opposite momenta in the reference frame of the incident pump laser light 16. Thus one of the split photons, called the signal photon, will propagate via mode 19 towards the detector 14, where it will be detected, resulting in a heralding signal. At the same time, the other photon, called the idler photon will propagate via mode 18 to delay loop 15, which will impose a time delay on the idler photon that serves to allow a control hardware (not shown) sufficient time to register the heralding signal and react to it, e.g. by generating appropriate control signals to control devices using the idler photon in some quantum communications or computations task or, as is the primary focus in this disclosure, to use the idler photons that are generated randomly and process them such that a photon will be output quasi-deterministically at a pre-determined time or within a pre-determined short time window.

Figure 1B:
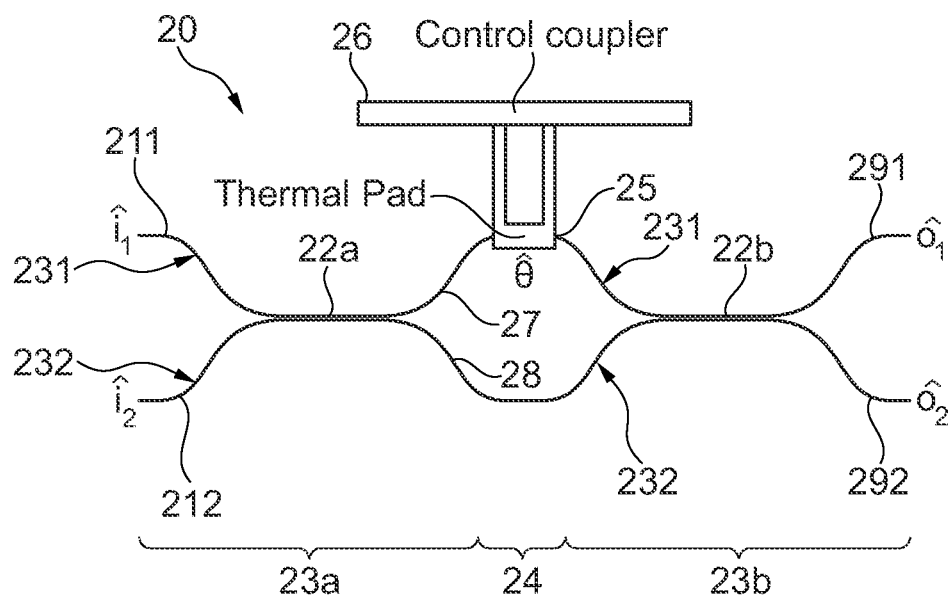
FIG. 1B is a schematic illustration of a two-input, two-output optical switch according to the prior art that is controlled by inducing a phase difference between two parallel optical paths by help of a thermal pad in one of its optical paths, thereby allowing only a single fast switching operation.
Figure 1C:
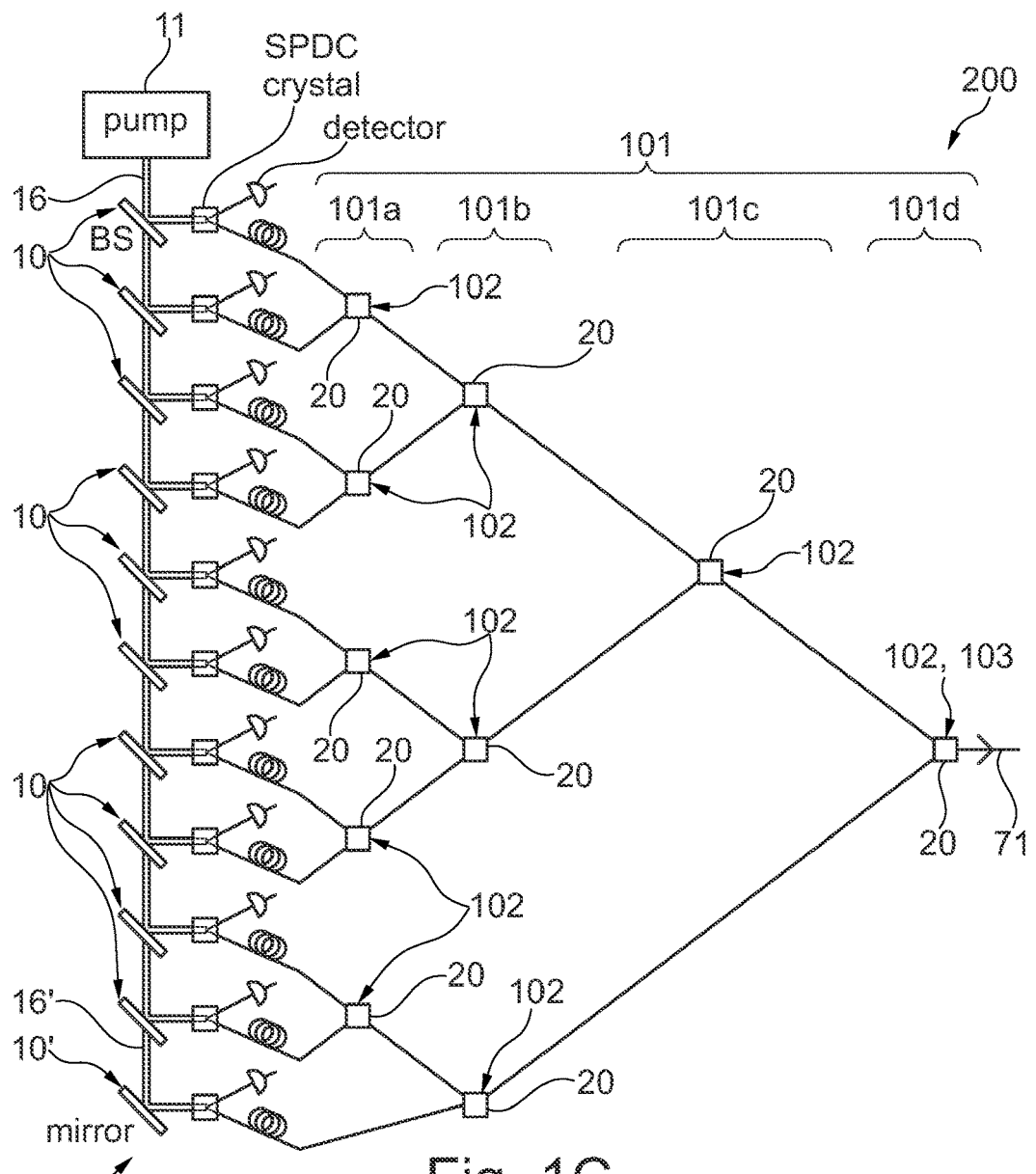
FIG. 1C is a schematic illustration of a known multiplexed single photon source employing several of the single photon sources of FIG. 1A arranged as leafs of a binary tree, the binary tree furthermore having one known optical switch according to FIG. 1B at each inner node as well as its root node.

FIG. 1B illustrates schematically a two-input, two-output optical switch according to the prior art that is controlled by inducing a phase difference between two parallel optical paths by help of a thermal pad in one of its optical paths.

The optical switch 20 is comprised of three components: a phase shifter 24 sandwiched between two directional coupler 23a, 23b on either side. Each component has, respectively, first and second input and output modes, wherein the output modes of one component are connected to the input modes of a subsequent component. The open modes 211, 212 of the first directional coupler 23a may serve as input modes and the open modes 291 and 292 of the second directional coupler 23b may serve as output modes or vice versa, since the layout is mirror-symmetric.

The directional couplers 23a, 23b comprise two optical paths 231, 232, which run parallel in close proximity to each other in the regions 22a and 22b respectively. In an integrated optics chip, the optical paths 231, 232 would be implemented as silicon waveguides. Another implementation might be as two optical fibers. The mutual distance of the paths 231, 232 in the proximity regions 22a, 22b as well as the length, for which they run parallel to each other determines the probability for a photon travelling in one of the optical paths to tunnel to the other. By selecting the mutual distance and the length a directional coupler may be designed such that it acts as an effective 50-50 beamsplitter, i.e. a photon entering in one mode, e.g. 211, has a 50% chance to be output in either of the output modes, which here lead into the two arms 27 and 28 connecting the proximity regions 22a and 22b. This amounts to a unitary transformation on the mode space corresponding to a Hadamard gate. More precisely, it amounts to a mapping of (the Hilbert space spanned by) the input modes to (Hilbert space spanned by) the output modes which is called a Hadamard gate/operation and has the matrix representation.

$$H = \frac{1}{\sqrt{2}} \begin{pmatrix} 1 & 1 \\ 1 & -1 \end{pmatrix}.$$

The phase shifter 24 comprises the two optical paths 27 and 28. In close proximity to the upper path 27 there is positioned a thermal pad 25, which is made from a material of comparatively high electrical resistivity, connected to a control coupler 26 which serves to couple in a control signal in the form of an electric current. The electric current flowing through the thermal pad 25 will cause it to heat up. Some of this heat will be transferred to the material constituting the optical path 27, causing the optical properties of that material to change. The result is a relative difference of the effective path length of the optical paths 27 and 28, which in turn causes an induced phase shift, here denoted by θ, between photons travelling along these two optical paths. The heating may be selected such that the phase shift θ corresponds to some desired angle, for instance θ=π. In general, the phase shifter amounts to a unitary mapping from its input to its output modes given by $$P(\theta) = \begin{pmatrix} \exp(i\theta) & 0 \\ 0 & 1 \end{pmatrix}.$$

The switch as a whole amounts to a unitary mapping given by the product of the effects of the three components $$S(\theta) = HP(\theta)H.$$

If the phase shifter in its default state, with thermal pad unpowered and both optical paths 27 and 28 at equal temperature, has a zero phase shift θ=0, i.e. both paths 27 and 28 are of the same effective length, the switch 20 as a whole thus amounts simply to an identity transformation $$S(\theta=0) = HP(0)H = H^2 = \sigma_0$$

with the 2D identity matrix $\sigma_0$. However, for θ=π the transformation is $$S(\theta=\pi) = HP(\pi)H = -H\sigma_z H = -\sigma_x,$$

with $\sigma_x$ and $\sigma_x$ the well known Pauli matrices. Thus the resulting operation is, up to a global phase factor −1, a unitary SWAP.

It is known to use the optical switch 20 depicted in FIG. 1B to create a quasi-deterministic single photon source out of multiple random single photon sources such as the one illustrated in FIG. 1A.

FIG. 1C shows a schematic illustration of a known multiplexed quasi-deterministic single photon source 200 employing several of the single photon sources of FIG. 1A arranged as leafs of a binary tree, the binary tree furthermore having one known optical switch according to FIG. 1B at each inner node including the root.

In the multiplexed single photon source 200, several, here eleven, random single photon sources 10, 10', corresponding to the source 100 of FIG. 1A without the pump laser, are stacked and supplied with pulsed laser light 16 from a common pump laser 16. The beamsplitters of the first individual single photon sources 10 are designed to "tap-off" part of the pump laser light, while for the last random single photon source 10' in the stack a mirror 12' is used in place of a beamsplitter, such that all photons of the remaining pump laser light 16' are reflected into the SPDC crystal of the random single photon source 10'.

The individual random single photon sources are now connected up to form a binary tree structure using the two-input, two-output optical switches the type described in FIG. 1B. In a first layer 101a of the binary tree 101, the output modes of the individual random single photon sources 10 are connected in pairwise fashion to the input modes of optical switches 20.

One output mode of each of the optical switches 20 in that first layer 102a is then connected, again in pairwise fashion, to the input modes of optical switches 20 in a second layer 102b. The other output mode is left open, and any photon exiting through one of these open output modes will be discarded. Due to there being an odd number of single photon sources, the output mode of one, in the example of the figure the last source 10' of the stack, cannot be paired up with an output mode of another source 10 and is rather paired with the output mode of an optical switch 20 of the first layer 102a.

The output modes of the switches in the second and all subsequent layers are then connected in pairwise fashion with each other or, accounting for any deviation of the number of individual sources from a power of 2, output modes of switches in lower layers or of the individual sources until a last or root node layer, in this example layer 101d, which contains only a single optical switch 20 corresponding to a root node 103 of the binary tree 101. One output mode of this root node serves as the output mode 71 of the multiplexed single photon source 200 as a whole.

In each pump cycle, the random single photon sources 10, 10' will produce heralded single photons. Based on the heralding signals from the individual sources 10, 10' a control unit (not shown) will determine which settings of the optical switches are required to route one of the photons to the output mode 71.

The delay 15 in the individual random single photon sources 10, 10' serves to allow the control unit enough time to make that determination and also switch the optical switches accordingly.

The precise number of random single photon sources 10, 10' used in this approach can be changed and depends on the desired overall success probability. Disregarding propagation losses, the minimum number K of random sources required for a desired minimum overall success probability Ps where the individual random single photon sources have a per-pump cycle probability of p to produce a heralded photon is given by $$K \geq \frac{\log(1-P_s)}{\log(1-p)}.$$

In case of $P_s \geq 0.99$ and p=0.01 this gives K≥459 (rounded up). Thus, one may see that a disadvantage of these known binary-tree type multiplexed single photon sources as schematically illustrated here is their comparative complexity stemming from the large number of components, both for the individual random single photon sources 10, 10' forming the leafs of the tree 101, as well as the optical switches 20 forming the nodes 102, 103 of the tree 101.

A further disadvantage becomes apparent when considering the timescales involved in the switching operation of the optical switches.

Figure 2A:
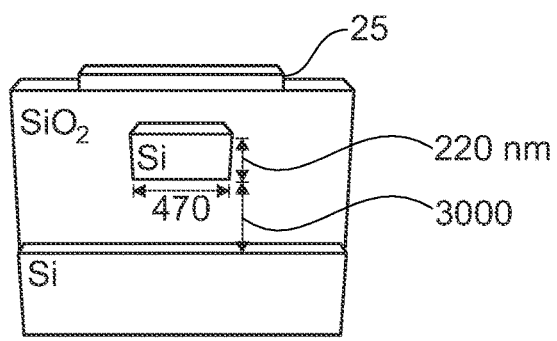
FIG. 2A is a schematic view of the part of the silicon waveguide of FIG. 1B containing the thermal pad for effecting a phase difference.

In a schematic view of the part of the silicon waveguide FIG. 1B containing the thermal pad for effecting a phase difference is illustrated in FIG. 2A. As it can be seen, the thermal pad 25 requires to heat a comparatively large volume in the waveguide in order to change the optical properties enough to induce a large phase shift, such as a phase shift θ=π. Even so, the time required for heating the waveguide and therefore the time $T_s$ for switching the switch from its default to its "on"-state can be relatively short, on the order of a few nanoseconds.

Figure 2B:
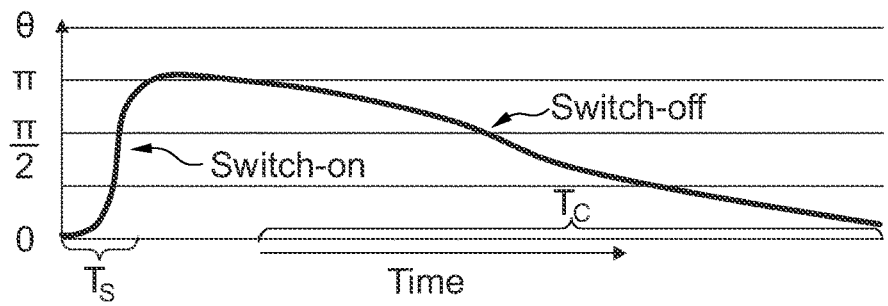
FIG. 2B is an exemplary graph illustrating the phase difference ⊠ as a function of time in an optical switch according to FIG. 1B.

However, as can be seen from FIG. 2B, which illustrates how the phase difference in the known optical switch of FIG. 1B changes in time, the time required for the optical switch to return to its default state, here denoted by $T_c$, is the time required for the waveguide to cool to ambient temperature and is orders of magnitude longer than the switching time $T_s$. The known optical switches can therefore be considered one-way switches in that they can effectively only be turned on, but not off.

This is the underlying reason behind the second major disadvantage of the known multiplexed single photon sources as illustrated in FIG. 1C, namely that their rate of quasi-deterministic photon production is limited by the cooling time $T_c$ the optical switches require to reset to their default state and become usable again. This is the case because one cannot predict which of the random single photon sources will produce a heralded photon in the next pump cycle and therefore which setting of the optical switch will be required to route a photon to the output mode 71 of the multiplexed source 200.

Embodiments of the multiplexed quasi-deterministic single photon sources of this invention overcome some or all of these disadvantages.

Figure 3A:
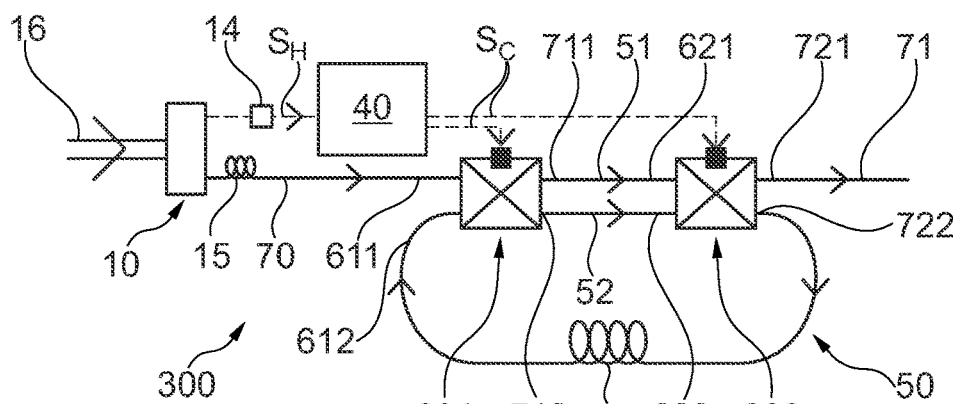
FIG. 3A is a schematic illustration of a multiplexed heralded single photon source according to a first embodiment of the invention comprising a closed optical path with two optical switches irrespective of the number of pump cycles.

FIG. 3A shows a schematic illustration of a multiplexed heralded quasi-deterministic single photon source according to a first embodiment of the invention in which only known optical components are used.

The photon source 300 comprises a random single photon source 10 as described with reference to FIG. 1A, two optical switches 201 and 202 of the one-way type described with respect to FIG. 1B connected in series and a control unit 40. The output mode 70 of the random single photon source 10 is connected to the first input mode 611 of the first optical switch 201. The first optical switch 201 and the second optical switch 202 are connected in series in that the first and second output modes 711 and 712 of the first optical switch 201 are connected respectively to the first and second input modes 621 and 622 of the second optical switch 202, thereby creating a first optical path 51 connecting the first output and input modes and a second optical path 52 connecting the second output and input modes respectively. A first output mode 721 of the second optical switch 202 is connected to the output mode 71 of the multiplexed single photon source 300. The second output mode 722 of the second optical switch is connected to the second input mode 612 of the first optical switch by a delay loop 53 which introduces a time delay $T_d$ on any photon propagating through it. Together, the second optical path 52 and the delay loop 53 form the closed optical path 50. The total time taken by a photon for one lap of that closed optical path 50 is the lap time $T_l$ which is given by $T_l=T_d+T_2$, with $T_2$ being the time taken to traverse the second optical path 52 which includes the stretches that belong to the two optical switches 201 and 202.

The control unit 40 receives the heralding signals $S_H$ from the single photon detector 14, thereby being alerted to the production of a photon in the random single photon source 10. The control unit 40 then controls the optical switches 201 and 202 by means of control signals $S_C$ based on this heralding signal $S_H$ as well as the current cycle number n.

In the following the quasi-deterministic generation of single photons by means of the multiplexed single photon source 300 is described. The goal therein to output a photon at the end of a generation cycle lasting for a time $T_g=NT_l$ and comprising N sub-cycles or lap cycles of duration $T_l$ each. Before the start of the generation cycle, the two optical switches 201 and 202 are reset to their default state. In case of the first optical switch 201, this default state corresponds, in some embodiments, to a unitary SWAP operation on its input modes 611 and 612, while for the second, or last, optical switch 202 the default state corresponds to an identity operation. In these embodiments, the first photon to be generated by the random single photon source 10 will, after traversing the first optical switch 201, be output on its second output mode 712 and thereby be routed or shunted onto the closed optical path.

With a sufficient delay after the registration of the heralding signal $S_H$, but before the photon has completed its first lap, the control unit 40 will send a control signal $S_c$ to the first optical switch 201 in order to switch it to its 'on' state, which corresponds to an Identity operation. Since both optical switches 201 and 202 are now in a state corresponding to an Identity operation, the photon on the closed optical path will remain there until a further action of the control unit 40 or until it is lost, that is absorbed by the material of the closed optical path 50 or scattered out of the closed optical path 50 uncontrollably.

During the Nth lap cycle the control unit will send a control signal $S_c$ to the second switch 202 in order to switch it to its "on" state corresponding to a unitary SWAP operation. Therefore, when the photon next passes through the second switch 202 at time $T_g-\tau$, where r is the time it takes the photon to pass through the switch and propagate to the output mode 71, it will be shunted off the closed optical path and routed to the output mode 71 of the multiplexed single photon source 300, where it will, as desired, be output at time $T_g$.

The number of lap cycles N used in this or any other embodiment of the single photon source of the invention may be any natural number, for instance there may 1, 2, 3, 4, 5, 10, 15, 20, 25, 30, 40, 50, 60, 70, 80, 90, 100, 200, 1000 or 2000. The number of lap cycles N is chosen dependent on the desired overall success probability $P_s$.

In some embodiments, the pump period $T_p$ is synchronized with the lap time, $T_p$. In these embodiments, N obeys the same relationship with $P_s$ and the probability p for the random single photon source 10 to produce a photon as the number K of individual single photon sources required in the known multiplexed single photon source 200 of FIG. 1C, i.e.

$$N \geq \frac{\log(1-P_s)}{\log(1-p)}.$$

After each generation cycle of the multiplexed single photon source 300 there has to be a sufficiently long waiting time for the switches to be able to reset their respective default states. This waiting time will have to be at least $T_c-T_g$ and will therefore in general reduce the rate at which quasi-deterministic single photon sources can be produced. However, in preferred embodiments, for instance if the generation probability of the random single photon source is low and/or a particularly high overall success probability is desired, the length of a generation cycle is chosen greater or equal to the cooling time, i.e. $T_g \geq T_c$ by choosing the total cycle number N appropriately $N \geq T_c/T_l$.

Figure 3B:
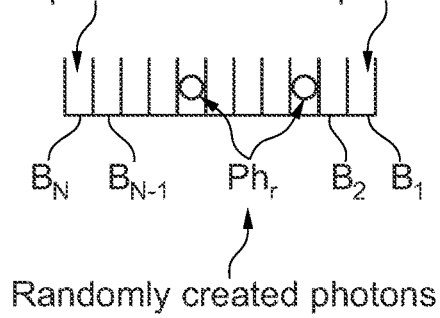
FIG. 3B is an illustration of a time bin shunt of randomly created single photons effected by the single photon source of FIG. 3A where the number of bins corresponds to the total number of pump cycles.

What the multiplexed single photon sources of the embodiments of this invention effectively accomplish is illustrated in FIG. 3B.

As shown there, the N lap cycles correspond to N time bins $B_1, B_2, \ldots B_N$, which are filled at random with 0 or 1 photon, depending on whether the random single photon source produces a heralded photon in that cycle or not. By storing one or, in some embodiments, more, photons on the closed optical path and releasing it at the appropriate time, i.e. the end of a generation cycle, the multiplexed sources of the invention effectively shift one of the photons to the last time bin $B_N$.

However, in embodiments of the multiplexed single photon source 300 of FIG. 3A, where only the first random photon produced will be preserved, for large total cycle numbers N, the overall success probability $P_s$ will be reduced significantly by losses. Assuming a per-lap loss probability of $p_l$, the overall success probability of the multiplexed single photon source 300 as a whole is given by $$P_s = \frac{q_l}{1-2q_l}\left[\frac{1}{2^N} - q_l^N\right]v$$

with the per lap survival probability $q_l=1-p_l$. This is not, as it may appear, divergent at $q_l=\frac{1}{2}$. Rather it may be analytically continued to $P_s(q_l=\frac{1}{2}, N)=N/2^N$. The values at 0 and 1 are respectively $P_s(0)=0$ and $P_s(1, N)=1-\frac{1}{2}^N$. The reduction by $\frac{1}{2}^N$ comes from the fact that there is a $1:2^N$ chance that no heralded photon is generated at all. For $p_l \ll 1$ and $N \gg 1$ one has $P \approx 1-Np_l$, which shows that the maximum achievable overall success probability is significantly reduced due to losses even for moderate $Np_l$.

To avoid this, there are proposed embodiments of the multiplexed single photon source of the invention employing an optical switch that, while not being fully two-way in the sense that it may be freely switched quickly, i.e. within a switching time $T_s$ in the range of nanoseconds, back and forth between its default or "off"-state and its "on"-state, can be switched twice before it has to be reset by depowering it and waiting for a time $T_c$.

Figure 4A:
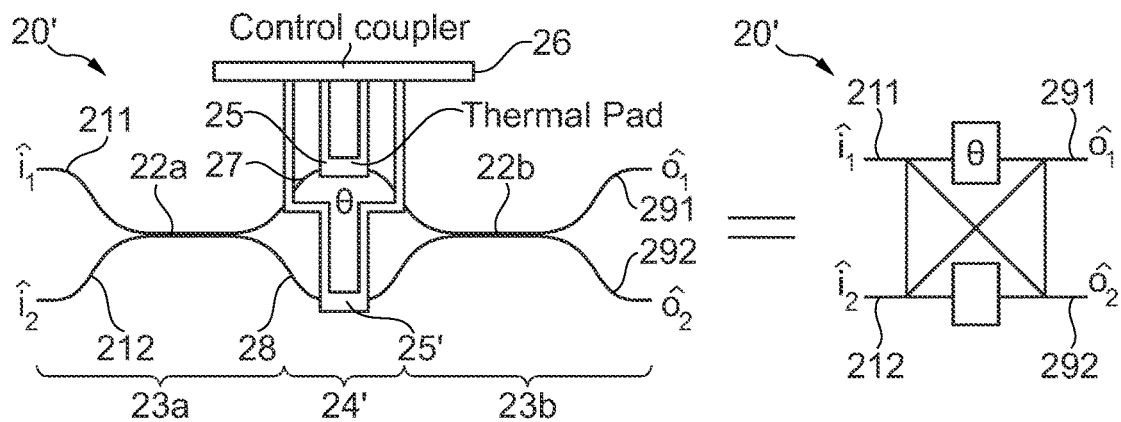
FIG. 4A is a two-input, two-output optical switch according to this disclosure employing a thermal pad in both of the parallel optical paths, thereby allowing two fast back-to-back switching operations.

Such a double-switching-type two-input, two-output optical switch is depicted schematically in FIG. 4A. Its design is very similar to the known optical switch shown in and described above with reference to FIG. 1B, however it employs a thermal pad in both of the parallel optical paths 27 and 28. In this way, starting in its default state corresponding to some unitary mapping of the input to the output modes, e.g. an Identity or a SWAP, it can be switched first to one state by powering up one of the thermal pads, e.g. thermal pad 25, and then it can be quickly switched to another state by means of the other, unused thermal pad, e.g. thermal pad 25'.

Depending on the control signals sent to the thermal pads 25, 25', the switch 20' may be switched between a first or default state, a second state, and a third state, all three states corresponding to different unitary operations, or, alternatively, the control signals are such that the third state equals the first state in the sense that both correspond to the same unitary operation on the input modes. It is in this latter way that the double-switching type switch 20' is going to be used in the preferable embodiments of the multiplexed single photon source described in the following.

Figure 4B:
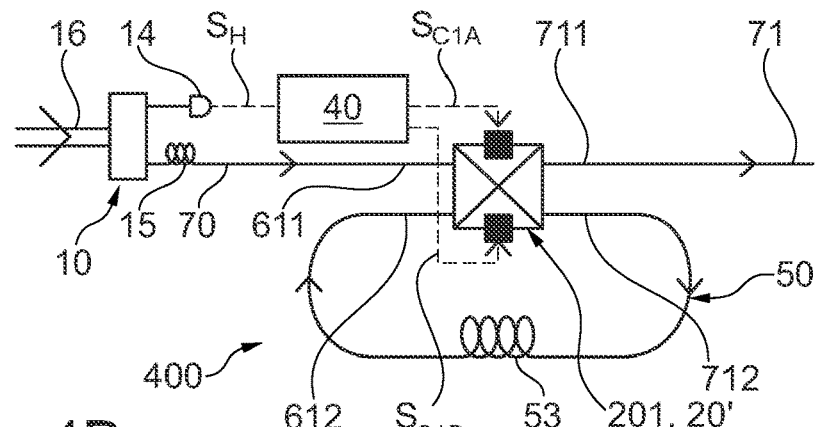
FIG. 4B is a schematic illustration of a multiplexed heralded single photon source according to a second embodiment of the invention employing a single optical switch of FIG. 4A.

In FIG. 4B a schematic illustration of a multiplexed heralded single photon source 400 according to a second embodiment of the invention is shown. Irrespective of the number of pump cycles, it employs only a single optical switch 20' of the double switching type depicted in FIG. 4A. The general layout of the multiplexed heralded single photon source 400 is as for the multiplexed heralded single photon source 300 of the first embodiment of FIG. 3A. However, as there is only a single optical switch 20' in place of the series of two optical switches 201 and 202 of the first embodiment, the first and second optical paths are reduced to the sections inside the optical switch 20' and the closed optical path 50 can be nearly identified with the delay loop 53.

Similar to the first switch 201 in the single photon source of the first embodiment of FIG. 3A, the optical switch 20' of this embodiment may by default be in a state corresponding to a SWAP operation, i.e. in the state where both thermal pads are inactive, the phase difference between the first and second optical paths 27 and 28 equals ⊠. If this is the case, the first heralded photon generated by the random single photon source 10 is automatically routed onto the closed optical path 50. Once that first photon has been heralded, the control unit activates the first thermal pad to switch the switch to the "off" state corresponding to a θ=0 phase difference between the optical paths.

This state is maintained by a low continuous heating power supplied to the first thermal pad, because without this continuous heating, a noticeable deviation from θ=0 resulting in undesirable additional photon losses would develop relatively quickly, namely on timescales comparable to the switching time $T_s$, even though a full reset of the optical switch 20' to its default state of θ=π takes much longer, namely at least the cooling time $T_c \gg T_s$.

As in the first embodiment, the control unit 40 will, during the Nth lap cycle, send a control signal to cause the photon to be routed to the output mode 71 of the multiplexed single photon source 400. In this embodiment, this is accomplished by sending a control signal $S_{C,1B}$ to the second thermal pad of the optical switch 20'.

This embodiment has the distinction of realizing the concept of the invention with fewest number of parts, requiring, besides the random single photon source, control unit and delay loop common to all embodiments, only a single optical switch.

This second embodiment suffers from the same downside as the first embodiment in that losses occurring when a photon loops around the closed optical path 50 reduce the overall success probability.

In embodiments where the first switch is in a state corresponding to a SWAP operation by default, both the multiplexed single photon source 300 of FIG. 3A and 400 of FIG. 4B necessarily have to use a greedy strategy with respect to "capturing" randomly generated heralded photons on the closed optical path. I.e. in both cases the first such heralded photon is routed onto the closed optical path 50 and kept there, hoping that it will not be lost, until the last lap cycle n=N.

With the constraints of using as few as possible optical switches, either of the known type or of the double-switching type presented above, no other strategy is possible. However, combining the two embodiments by using double-type optical switches in place of the two known switches of the first embodiment of FIG. 3A allows the implementation of a non-greedy random photon capturing strategy. In this embodiment, the first optical switch would have a default state corresponding to an Identity operation.

Thus, it is not necessarily the first randomly generated heralded photon that is captured. Rather the control unit 40 decides based on the number n counting the current lap cycle of whether a heralded photon should be routed onto the closed optical path 50 or not. If that first photon is generated close to the beginning of a generation cycle, i.e. for n≪N, the control unit 40 could, for instance, decide to skip that photon and wait for one that is generated at a later time.

This decision could be made deterministically or probabilistically. A simple deterministic strategy could be to always disregard the first and capture the second randomly generated photon. Disregarding losses, the overall success probability associated with this strategy is reduced, compared to the greedy strategy, to $P_s^{2nd}(q_l=0)=1-(N+1)/2^N$, reflecting the fact that in N out of $2^N$ additional cases no photon will be output. Including, as before, per lap losses in the form of a probability $p_l$ that a photon on the closed optical path will be lost on each cycle, corresponding to a survival probability $q_l=1-p_l$, the overall success probability of a "always capture the second heralded photon"—strategy is $$P_s^{2nd} = \frac{q_l}{2q_l-1}\left(q_l^N - Nq_l\frac{1}{2^{N-1}} + (N-1)\frac{1}{2^N}\right).$$

For small loss probabilities $p_l \ll 1$ and large $N \gg 1$, this is approximated by $$P_s^{2nd}=P_s^{2nd}(q_l=0)-(N-3)p_l.$$

Comparing this to the overall success probability of a greedy strategy, one can see that for $p_l > N/2^{N+1}$, the strategy of capturing the second instead of the first photon gives a superior overall success probability. For instance, for a lap cycle number of N=10, the break-even per-lap loss probability is $p_{l,b} \approx 0.5\%$ and close to that loss probability, the overall success probability of the capturing the second instead of the first photon will be better by roughly $2(p_l-p_{l,b}) \approx 2p_l-1\%$. For instance, if $p_l=1\%$, the overall success probability of the greedy strategy is approximately $P_s^{1st} \approx 1-\frac{1}{2}^{10}-9\times1\% \approx 90.9\%$, whereas capturing the 2nd photon gives a better $P_s^{2nd} \approx 1-1\frac{1}{2}^{10}-7\times1\% \approx 92.5\%$.

Since even using a non-greedy strategy, per lap losses still cause a significant reduction in overall success probability further improvements require the use of more components.

Figure 4C:
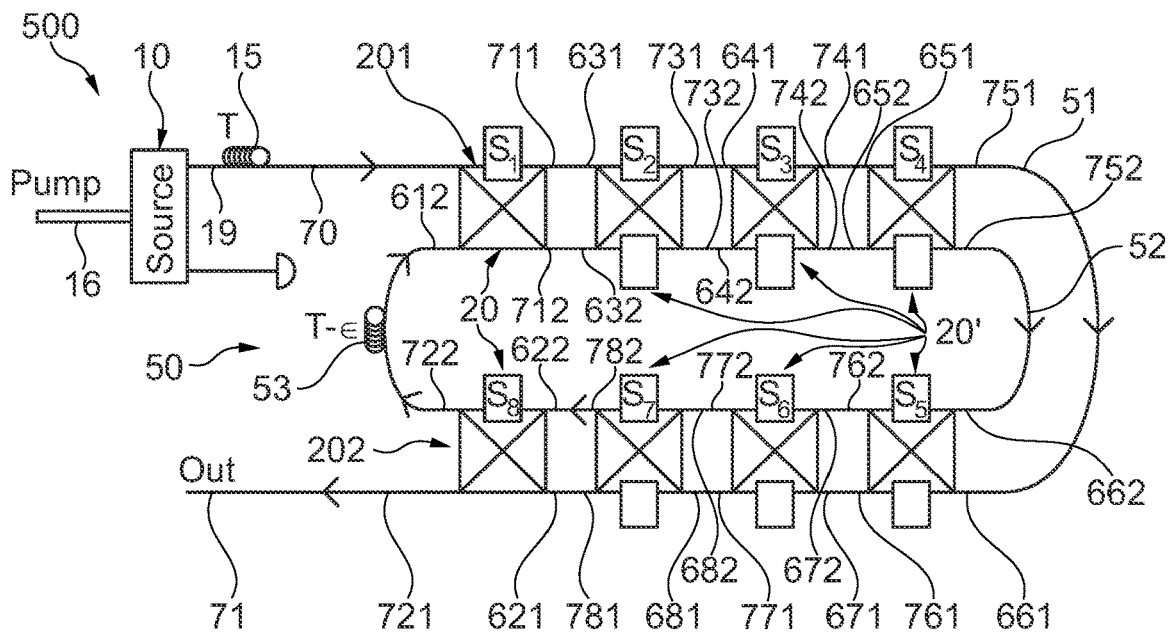
FIG. 4C is a schematic illustration of a multiplexed heralded single photon source according to a third embodiment of the invention employing multiple optical switches where the number of switches equals the total number of pump cycles.

FIG. 4C shows a schematic illustration of a multiplexed heralded single photon source 500 according to a third embodiment of the invention. This embodiment employs multiple optical switches, i.e. in addition to a first optical switch 201 and a last optical switch 202, which may be of the known one-way type, there are intermediate optical switches 20' connected in series between the first optical switch 201 and the last optical switch 202 such that a first and second output mode of an immediately preceding optical switch 20, 20' is connected to the first and second input mode of an immediately succeeding optical switch 20', 20. Thereby the optical switches 20, 20' form a series of optical switches in which respective first input and output modes lie on the first optical path 51 and respective second input and output modes lie on the second optical path 52. As in the first embodiment of FIG. 3A, the second optical path and a delay loop 53 connecting the second output mode 722 of the last optical switch 202 to the second input mode of the first optical switch 201. The intermediate switches 20' are of the double-switching type of FIG. 4A.

The operation of the multiplexed heralded single photon source 500 according to this embodiment is similar to the first and second embodiments. However, the presence of the additional switches 20' allows storing additional photons on the closed optical path 50 or refreshing photons already stored there. That is, when, after a first random photon has been routed onto the closed path 50, the generation of a further photon by the random single photon source 10 is heralded to the control unit (not shown in FIG. 4C), it will send a control signal to an as yet unused one of the intermediate switches 20' in order to route that photon onto the closed optical path.

In some embodiments, the pump period $T_p$ may be equal to the lap time $T_l$ or a fraction c of the lap time, i.e. $T_p=T_l/c$ in order to synchronize the arrival of fresh heralded photons with the photon or a photon looping around the closed optical path 50. Due to this synchronization, any heralded photon generated by the random single photon source 10 will arrive at the same optical switch in the series of optical switches 20, 20' at the same time as a photon that is currently being kept on the closed optical path 50. If in that case that switch is switched into a state corresponding to a SWAP operation, the photon on the closed optical path 50 will be routed off and the fresh photon routed onto that path. Alternatively or additionally, the intermediate switches 20' may be used to route an additional randomly generated photon onto the closed optical path, i.e. synchronized with a time bin, containing as ye no photon.

The capturing of further heralded photons and using them to "refresh" photons on the closed optical path may be done in a straightforward greedy fashion, whereby, as long as there are unused optical switches available, not counting the last optical switch which is reserved for routing the or a photon from the closed path 50 to the multiplexed single photon source 500's output mode 71, a next one among them, which may or may not be a next one in the order of the series of optical switches 20, 20', will be used to route the next photon generated by the single photon source 10 onto the closed optical path 50.

Alternatively and preferably, after the first heralded photon has been routed onto the closed optical path 50 by the first optical switch 201, the intermediate optical switches 20 are used in a non-greedy manner, not necessarily capturing every heralded random single photon.

For instance, the control unit may employ a deterministic non-greedy control strategy. Deterministic means in this context, that the decision to shunt a random photon onto the closed path or not is completely determined by the variables current lap cycle number n, current pump cycle number k or the number u of as yet unused intermediate switches 20', as well as the parameters total lap cycle number N, total pump cycle number K and total number of optical switches M.

A preferred deterministic control strategy is to discard every photon until there are only M−2 lap cycles or pump cycles left, i.e. until n=N−M+2 or k=K−M+2. This strategy waits until the latest possible time when there is still the potential to use all available intermediate optical switches 20'.

However, for larger numbers of intermediate optical switches M, most of the time there will remain many unused ones. A different control strategy seeks to spread the use of the intermediate switches more evenly by always employing the next designated unused switch on the next heralded random photon once the condition n/N>1−u/(M−1) is satisfied. In embodiments, where the number of pump cycles K differs from the number of pump cycles N, usually with K=cN for some integer c>1, deterministic control may done according to the condition k/K≥1−u/(M−1).

In other embodiments, a non deterministic non-greedy control strategy may be employed, wherein, when the generation of a fresh further photon by the random single photon source 10 is heralded, it will be captured with some probability $p_c$ using an as yet unused intermediate optical switch 20', wherein in general $p_c$ may be a function of the aforementioned variables n, k and u and the parameters N, K and M.

In a preferred probabilistic control strategy, the probability $p_c$ is given by the formula $$p_c = \min\left[1, \frac{n}{N - uN/(M-1)}\right].$$

If in the third embodiment of FIG. 4C, a double-switching type switch is used in place of a known one-way switch, non-greedy strategies involving discarding the first photon become possible.

These control strategies serve the purpose of achieving a good overall success probability if, for instance to keep complexity and cost of the multiplexed single photon source low, there are not enough optical switches to capture every random photon in all instances. However, in some embodiments, where being economical with the number of optical switches is not paramount, the number of optical switches M is chosen to equal the number of lap cycles N or pump cycles K. In these embodiments, nothing beyond the a straightforward greedy control is needed since there are enough optical switches available to ensure that there will always be an unused switch for every heralded photon.

Figure 5A:
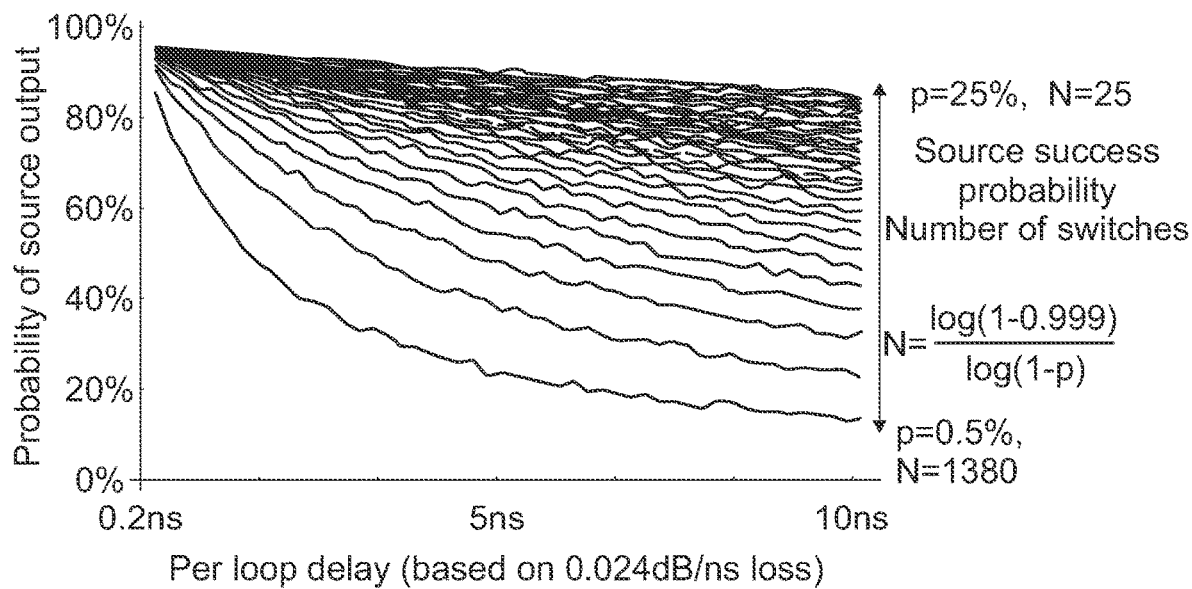
FIG. 5A is a plot of the overall success probability of a single photon source according to embodiments of the invention against the per-loop delay time Td for different pump success probability.

FIG. 5A shows a plot of the overall success probability of a single photon source according to embodiments of the invention against the per-loop delay time $T_d$ for different pump success probability. In this plot, the pump period is set to equal the lap time, $T_p=T_l$, which implies that the number of pump pulses K per generation cycle is equal to the number of lap cycles, K=N, and the number of switches equals the number of lap cycles, M=N. The number of lap cycles (or pump pulses or switches) is determined from the formula shown, which corresponds to the one described herein above and wherein a loss-free desired overall success probability of 99,5% is set. The different curves are for different random photon generation probabilities p, with p being varied between p=0,5%, leading to a N=1380 and p=25%, leading to N=25. The smallest delay time plotted is 0.2 ns. For $T_d=0$, all curves would meet at $P_s=0.999$.

As can be seen, increasing loop delays lead to decreasing overall success probabilities due to the increasing likelihood of loosing the photon before the end of the generation cycle. This effect is the larger, the larger N has to be in order to meet the chosen target success probability.

Figure 5B:
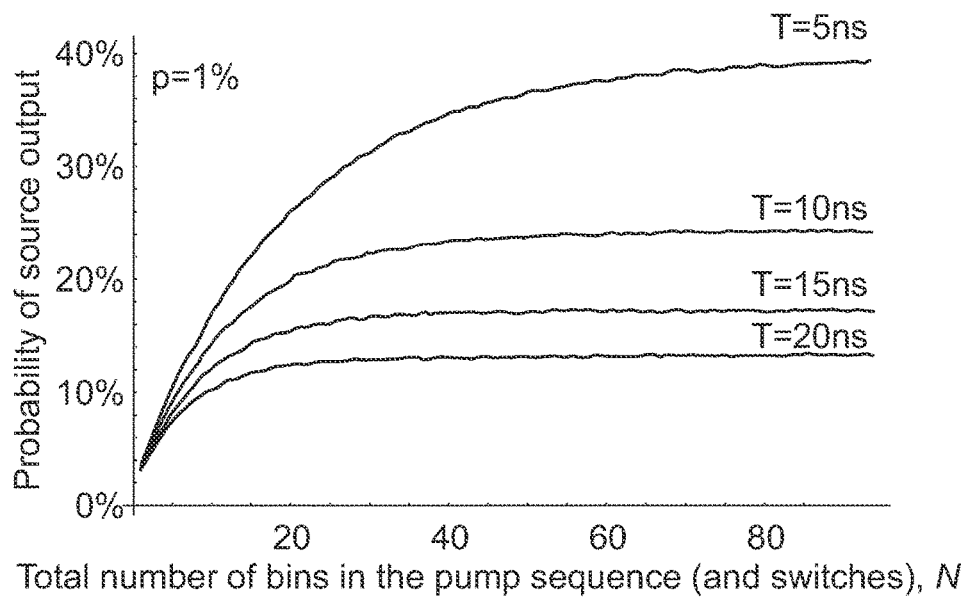
FIG. 5B is a plot of the overall success probability of a single photon source according to embodiments of the invention against the number of pump cycles for different delay times.

FIG. 5B shows a plot of the overall success probability of a single photon source according to embodiments of the invention against the number of pump cycles N for different delay times $T_d$ and an assumed generation probability p=1% of the random single photon source 10 and lap cycles corresponding to pump cycles, $T_l=T_p$. Here as well, the number of switches M was chosen to equal the total cycle number N, such that a simple greedy control strategy is sufficient to achieve an optimal overall success probability.

As can be seen, for increasing delay times, the overall success probability effectively saturates for lower and lower total cycle numbers, corresponding to the number of time bins.

Figure 6:
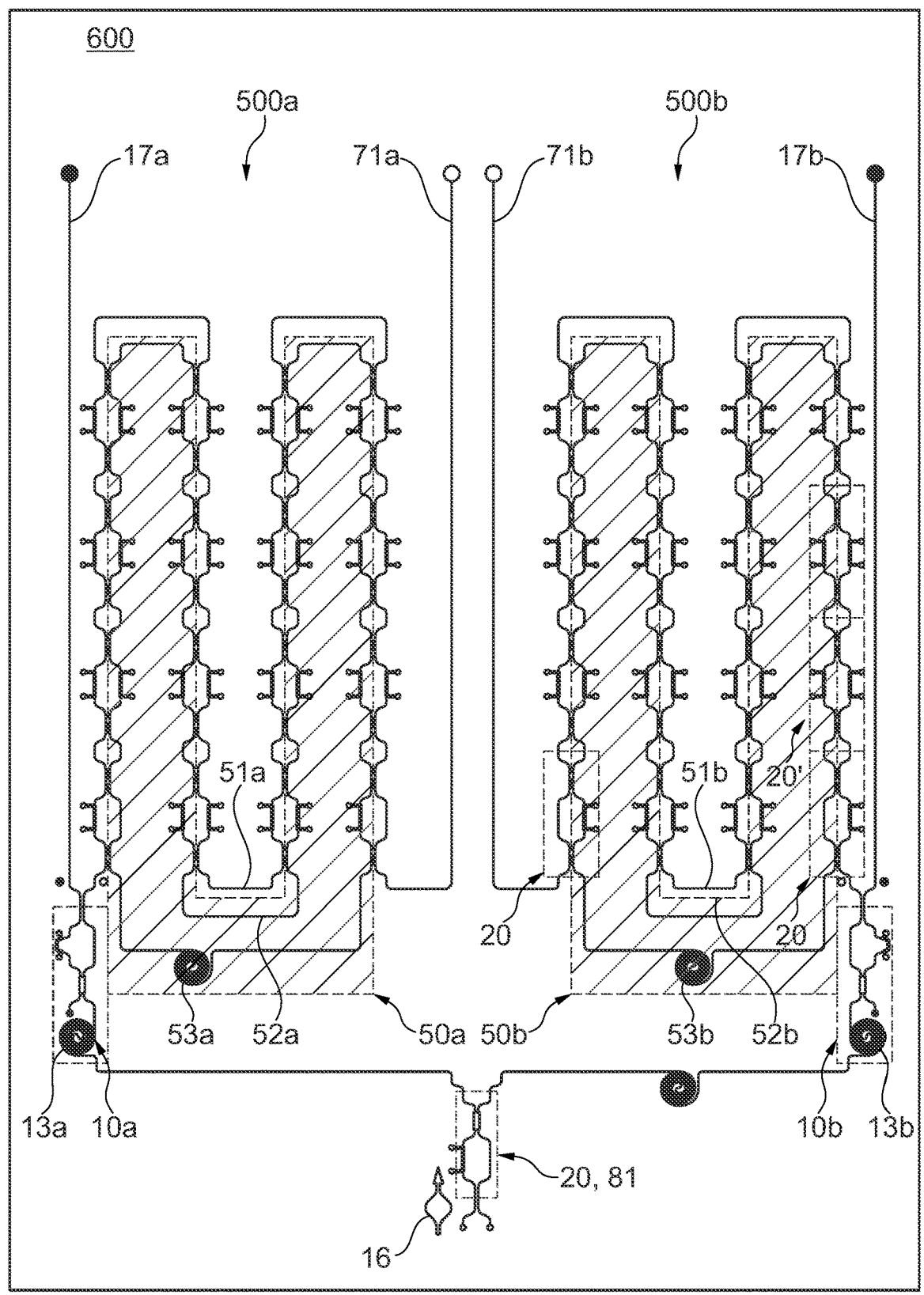
FIG. 6 is a layout for a silicon waver containing two multiplexed single photon sources according to embodiments of the invention capable of operating in parallel pumped by a common pump laser, wherein the waver may be fabricated using known techniques.

In FIG. 6 there is shown a layout for a silicon waver 600 containing two multiplexed single photon sources 500a, 500b according to embodiments of the invention capable of operating in parallel pumped by a single, common pump laser. The waver layout disclosed here may be fabricated using only known techniques, enabling quick implementation of the ideas presented herein.

A root optical switch 81 is used to route pump laser photons to a currently active one of the two multiplexed single photon sources 500a, 500b, which are of identical layout and correspond to the one depicted schematically in FIG. 4C. The only difference is that the random single photon sources 10a, 10b each comprise a loop of a fiber material allowing Spontaneous Four Wave Mixing (SFWM) in order to split incoming pump photons.

The hatched areas 50a, 50b contain the closed optical paths of each of the multiplexed single photon sources 500a, 500b respectively, with each closed optical path consisting of the second optical paths 52a, 52b and the delay loop 53a, 53b respectively. The modes 17a, 17b are the modes to route the signal photons to a single photon detector producing the heralding signal, while the modes 71a, 71b are the output modes of the respective single photon source 500a, 500b.

Although the embodiments of the present disclosure have been described with reference to preferred embodiments, workers skilled in the art will recognize that changes may be made in form and detail without departing from the spirit and scope of the present disclosure.

What is claimed is:

1. A multiplexed single photon source capable of producing pure single photons quasi-deterministically at a predetermined generation time $T_g=NT_d$, with the total number of lap cycles N being a natural number and $T_d$ being a delay time, the single photon source comprising:
    a pulsed random single photon source capable of randomly producing single photons with a probability p at a production rate corresponding to the inverse of a pump period $T_p$, wherein, when a single photon is randomly produced during a pulse, it is heralded by a heralding signal and is output on an output mode of the random single photon source;
    a first optical switch and a last optical switch, each having a first input mode and a second input mode and a first output mode and a second output mode, wherein:
        the first input mode of the first optical switch is connected to the output mode of the random single photon source;
        the first output mode of the last optical switch is connected to an output mode of the multiplexed single photon source;
        the first and last optical switches moreover each effect a unitary mapping from their respective input modes to their respective output modes, the unitary mapping depending on a state of the respective optical switch, wherein in a first state, the unitary mapping corresponds to a SWAP operation, and in a second state the unitary mapping corresponds to an Identity operation; and
        the first and last optical switches are capable of being switched from the first to the second state and/or from the second state to the first state within a switching time $T_s$, the switching time $T_s$ being smaller than or equal to the delay time $T_d$, by a control signal;
    a closed optical path comprising a delay loop introducing a time delay equal to the delay time $T_d$ to a photon and connecting the second output mode of the last optical switch to second input mode of the first optical switch; and
    a control unit controlling each of the first and last optical switches based on the heralding signal and the cycle number N, the cycle number corresponding to a maximum number of times a photon may loop around the closed optical path before being output,
        wherein, before or at the start of a first lap cycle, the control unit is configured to initialize the first optical switch in the first state and, if applicable, the last optical switch in the second state, such that, upon generation of a first photon by the random single photon source, that photon enters the first input mode of the first optical switch and, by being output on the second output mode of the first optical switch, is routed onto the closed optical path,
        wherein, based upon the heralding signal heralding the first photon, the control unit is configured to switch the first optical switch from its first state to its second state after the photon has been routed onto the closed optical path, thereby ensuring that the first photon loops around the closed optical path as long as the first and last optical switches remain in their respective second states,
        and, wherein, in an Nth lap cycle, the control unit is configured to switch the last optical switch from the second state to the first state, thereby causing the first photon on the closed optical path to be routed to the first output mode of the last optical switch and thus being output on the output mode of the multiplexed single photon source.

2. The multiplexed single photon source of claim 1, wherein the first optical switch and the last optical switch are the same optical switch, the optical switch being capable of at least two back-to-back switching operations, a first switching operation from the second state to the first state and a second switching operation back from the first state to the second state, wherein both switching operations may be completed within the switching time.

3. The multiplexed single photon source of claim 1, wherein the first optical switch and the last optical switch are different components and a first optical path exists between the first output mode of the first optical switch and the first input mode of the last optical switch and a second optical path exists between the second output mode of the first optical switch and the second input mode of the last optical switch, the second optical path forming part of the closed optical path.

4. The multiplexed single photon source of claim 3, comprising one or more further optical switches interposed between the first optical switch and the last optical switch, each of the further optical switches respectively comprising first and second input and output modes, wherein each respectively is capable of two back-to-tack switching operations comprising a first switching operation from the second state corresponding to an identity operation to the first state corresponding to a SWAP operation and a second switching operation from the first state to the second state wherein each switching operation may be completed within the switching time $T_s$, wherein the further optical switches are interconnected such that their first input and output modes form part of the first optical path and their second input and output modes form part of the second optical path such that all optical switches are connected in series, and wherein the control unit is configured to initialize each of the further optical switches in the second state.

5. The multiplexed single photon source of claim 4, comprising N−1 further optical switches.

6. The multiplexed single photon source of claim 4, wherein the control unit is configured to:
    switch, if the production of a further photon by the random single photon source is heralded by a further heralding signal, a first one of the further optical switches from the second state to the first state, thereby causing the further photon to be routed onto the closed optical path; and after the further photon has been routed onto the closed optical path, switch the first one of the further optical switches back to the second state within the switching time $T_s$, thereby ensuring that the further photon now on the closed optical path is not shunted out of the closed optical path on its next loop.

7. The multiplexed single photon source of claim 1, wherein a pump period $T_p$ is an integer fraction of the lap time $T_l=cT_p$ with c, an integer less than one.

8. The multiplexed single photon source of claim 7, comprising c groups of optical switches, each group comprising a first optical switch and a last optical switch, which may be the same component, wherein the first optical switch of each group is used to fill an sub-time bin on the closed optical path associated with that group of optical switches and the last optical switch is used to empty the sub-time bin associated with that group of optical switches.

9. The multiplexed single photon source of claim 1, wherein a total number of optical switches M is smaller than the total number of lap cycles N or the total number of pump cycles K, and the control unit is configured to control the optical switches using a control strategy, in particular a deterministic control strategy or a probabilistic control strategy.

10. A method for quasi-deterministically generating single photons at a predetermined generation time $T_g=NT_d$, with the total number of lap cycles N being a natural number and $T_d$ being a delay time, by means of a multiplexed single photon source, the multiplexed single photon source comprising:
  a pulsed random single photon source capable of randomly producing single photons with a probability p at a production rate corresponding to the inverse of a production period, wherein, when a single photon is randomly produced, it is heralded by a heralding signal and is output on an output mode of the random single photon source;
  a first optical switch and a last optical switch, each having a first input mode and a second input mode and a first output mode and a second output mode, wherein the first input mode of the first optical switch is connected to the output mode of the random single photon source, wherein the first and last optical switch are configured to realize a unitary mapping from the input modes to the output modes, the unitary mapping depending on a state of the respective optical switch, wherein in a first state, the unitary corresponds to a SWAP operation, wherein in a second state the unitary mapping corresponds to an Identity operation, and wherein the first and last optical switch are capable of being switched from the first to the second state and/or from the second state to the first state by a control signal;
  a closed optical path comprising a delay loop introducing a delay Td to a photon and connecting the second output mode of the last optical switch to second input mode of the first optical switch;
  a control unit controlling each of the first and last optical switches based on the heralding signal and a cycle number N, the cycle number N being a natural number corresponding to a number of, the method comprising:
    before or at the start of a first lap cycle, initializing the first optical switch in the first state and, if applicable, the last optical switch in the second state, such that, upon generation of a first photon by the random single photon source, that first photon enters the first input mode of the first optical switch and, by being output on the second output mode of the first optical switch, is routed onto the closed optical path;
    based upon the heralding signal heralding the first photon, switching the first optical switch from its first state to its second state after the photon has been routed onto the closed optical path, thereby ensuring that the photon loops around the closed optical path as long as the first and last optical switches remain in their respective second state; and
    in an Nth lap cycle, switching the last optical switch from the second state to the first state thereby causing the first photon on the closed optical path to be shunted to the first output mode of the last optical switch and thus being output on the output mode of the multiplexed single photon source.

11. The method of claim 10, wherein the multiplexed single photon source comprises one or more intermediate optical switches, the method comprising:
  before or at the start of the first lap cycle, initializing the intermediate switches in the second state,
  upon receiving a heralding signal heralding the further photon, switching a next unused one of the one or more intermediate optical switches from the second to the first state, thereby causing the further photon to be routed onto the closed optical path.

12. The method of claim 11, wherein an arrival of a further photon produced by the random single photon source is synchronized with an arrival of a stored photon on the closed optical at the first switch and the further photon is used to refresh the photon on the closed optical path by, through switching the next unused intermediate optical switch from the second state to the first state, swapping the further photon and the stored photon such that the further photon is routed onto the closed optical path while at the same time the stored photon is routed to the output mode.

13. The method of claim 11, comprising switching the next unused intermediate optical switch from the first state to the second state to ensure that no photon on the closed optical path is routed to the output mode prematurely.

14. The method of claim 10, wherein a total number M of optical switches is smaller than the total cycle number N and a non-greedy control strategy is used.

15. The method of claim 14, wherein one of a probabilistic non-greedy control strategy and a deterministic non-greedy control strategy is used.

16. The method of claim 15, wherein the deterministic non-greedy control strategy comprises always routing a next heralded photon generated by the random single photon source onto the closed optical path using a designated next one of a set of unused intermediate optical switches when the condition $n/N \geq 1-u/(M-1)$ is satisfied, wherein n counts the current cycle number and u the number of as yet unused intermediate optical switches.

17. The method of claim 16, wherein the probabilistic non-greedy control strategy comprises routing a next heralded photon generated by the random single photon source onto the closed optical path using a designated next one of a set of unused intermediate optical switches with a probability $p_c$ determined according to formula $$p_c = \min\left[1, \frac{n}{N - uN/(M-1)}\right]$$

or the formula $p_c=\min[1,n/(N-u)]$, wherein n counts the current cycle number and u the number of as yet unused intermediate optical switches.

18. The method of claim 17, wherein the pump period $T_p$ is smaller than the lap time $T_l$ and there are two or more sub-time bins are reserved to be filled with heralded photons generated by the random single photon source.

19. The method of claim 18, wherein the pump period $T_p$ is an integer fraction c of the lap time $T_l$, i.e. $T_p=T_l/c$, and the number of sub-time bins are reserved to be filled with heralded photons generated by the random single photon source is equal to this integer fraction c.

20. A method of quasi-deterministically generating single photons with a multiplexed single photon source wherein heralded photons generated by random single photon source are sent through a series of optical switches each having first and second input and output modes and each capable of being switched from a first state corresponding to a SWAP operation to a second state corresponding to an Identity operation on the mode space, wherein the first and second input and output modes of the optical switches are connected in series to form a first and second optical path respectively, and wherein a first output mode of a last optical switch forms the output mode of the multiplexed single photon source and a second output mode of the last optical switch is connected by a delay loop introducing a time delay $T_d$ to the second input mode of a first optical switch, wherein the first and last optical switches may be the same component, the method comprising:

initializing, before or at the start of a first lap cycle, the first switch in the first state and all subsequent switches in the second state;

switching, when the generation of a random single photon is heralded, the first switch to the second state after that photon has been routed onto the closed optical path formed by the second optical path and the delay loop, thereby ensuring that the photon may loop around the closed optical path; and switching, at the start of the Nth cycle, a last switch of the series of optical switches into the first state, thereby causing the photon to be routed out of the closed optical path and into the output mode of the multiplexed single photon source, such that the photon is output quasi-deterministically at a time $NT_d$ after the start of the first lap cycle.

* * * * *